(12) United States Patent
Soin et al.

(10) Patent No.: US 10,563,965 B1
(45) Date of Patent: Feb. 18, 2020

(54) GPS ARROW SYSTEM TO TRACK A MOVING OBJECT

(71) Applicants: Dhilen N. Soin, Dayton, OH (US); Aviraj G. Soin, Dayton, OH (US)

(72) Inventors: Dhilen N. Soin, Dayton, OH (US); Aviraj G. Soin, Dayton, OH (US)

( * ) Notice: Subject to any disclaimer, the term of this patent is extended or adjusted under 35 U.S.C. 154(b) by 0 days.

(21) Appl. No.: 16/362,872

(22) Filed: Mar. 25, 2019

(51) Int. Cl.
  *F42B 12/38* (2006.01)
  *G01S 19/19* (2010.01)

(52) U.S. Cl.
  CPC ............ *F42B 12/385* (2013.01); *G01S 19/19* (2013.01)

(58) Field of Classification Search
  CPC .... G01S 19/42; G01S 3/02; F42B 6/04; F42B 12/38
  See application file for complete search history.

(56) References Cited

U.S. PATENT DOCUMENTS

| | | | | |
|---|---|---|---|---|
| 3,756,600 A * | 9/1973 | Maleski | ............ | F42B 6/08 473/584 |
| 4,203,601 A * | 5/1980 | Simo | ............ | F42B 6/08 473/583 |
| 4,234,191 A * | 11/1980 | Erlandson | ............ | F42B 6/08 473/583 |
| 4,452,460 A * | 6/1984 | Adams | ............ | F42B 6/08 473/584 |
| RE34,397 E * | 10/1993 | DelMonte | ............ | F42B 6/08 473/584 |
| 5,450,614 A * | 9/1995 | Rodriguez | ............ | F42B 6/02 455/128 |
| 6,409,617 B1 * | 6/2002 | Armold | ............ | F42B 12/385 455/98 |
| 6,863,630 B1 * | 3/2005 | Watkins | ............ | F42B 6/08 473/583 |
| 7,232,389 B2 * | 6/2007 | Monteleone | ............ | F42B 12/40 473/578 |
| 7,300,367 B1 * | 11/2007 | Andol | ............ | F42B 6/04 342/385 |
| 7,632,199 B2 | 12/2009 | Kikos | | |
| 8,075,430 B1 * | 12/2011 | Hester | ............ | F42B 12/385 473/578 |
| 8,088,028 B2 | 1/2012 | Jones | | |
| 9,423,504 B1 * | 8/2016 | Gossett | ............ | G01S 19/19 |
| 9,482,505 B2 | 11/2016 | Roman | | |
| 9,843,704 B2 | 12/2017 | Lyren | | |
| 10,317,180 B2 * | 6/2019 | Russell | ............ | F42B 12/362 |

(Continued)

*Primary Examiner* — Eugene L Kim
*Assistant Examiner* — Christopher Glenn
(74) *Attorney, Agent, or Firm* — Neustel Law Offices

(57) ABSTRACT

A GPS arrow system to track a moving object. The GPS arrow system to track a moving object generally includes an arrowhead comprising a blade and an opening in the blade, a GPS tracking unit comprising a GPS attachment opening, and an attaching ring for attaching the GPS tracking unit to the arrowhead. The attaching ring comprises a gap that is expandable so that an end of the attaching ring can be passed through the opening in the arrowhead and the GPS attachment opening, for connecting the GPS tracking unit to the arrowhead. The arrowhead may be attached to the shaft of an arrow. The GPS tracking unit can transmit position signals that can be received by a handheld unit being carried by a user, such as a hunter, and used to track a moving object.

13 Claims, 11 Drawing Sheets

(56) References Cited

U.S. PATENT DOCUMENTS

| | | | |
|---|---|---|---|
| 2003/0132846 A1* | 7/2003 | Hilliard | A01K 11/008 340/573.2 |
| 2009/0170644 A1* | 7/2009 | Sames | F42B 6/08 473/584 |
| 2010/0035709 A1* | 2/2010 | Russell | F42B 12/385 473/570 |
| 2011/0250996 A1* | 10/2011 | Jones | F42B 12/385 473/570 |
| 2011/0306447 A1 | 12/2011 | Mcfatridge | |
| 2012/0196708 A1 | 8/2012 | Maddox | |
| 2012/0306688 A1* | 12/2012 | Fereghetti | G01S 19/19 342/357.25 |
| 2013/0176175 A1* | 7/2013 | Zusman | G01S 5/0226 342/458 |
| 2014/0062775 A1 | 3/2014 | Fereghetti | |
| 2016/0091610 A1 | 3/2016 | Eggers | |
| 2017/0241756 A1 | 8/2017 | White, Jr. | |
| 2018/0142996 A1* | 5/2018 | Wetzler | F42B 6/08 |

* cited by examiner

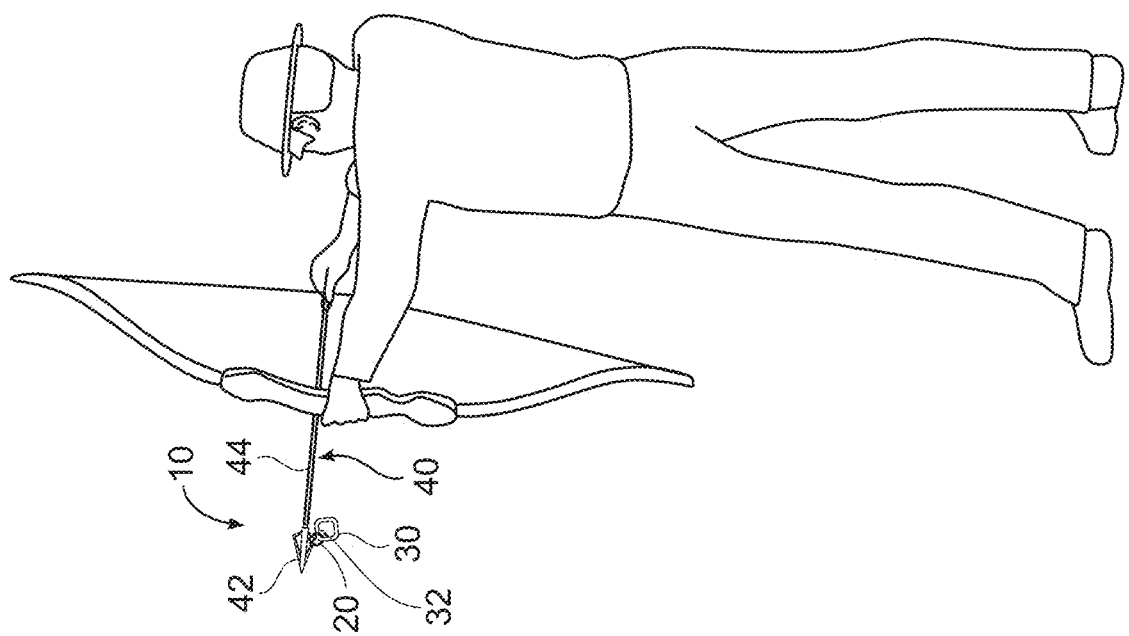
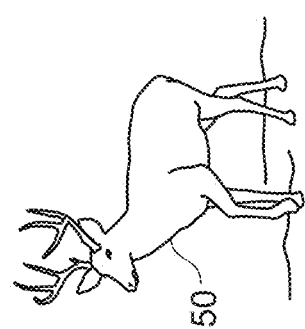
FIG. 1

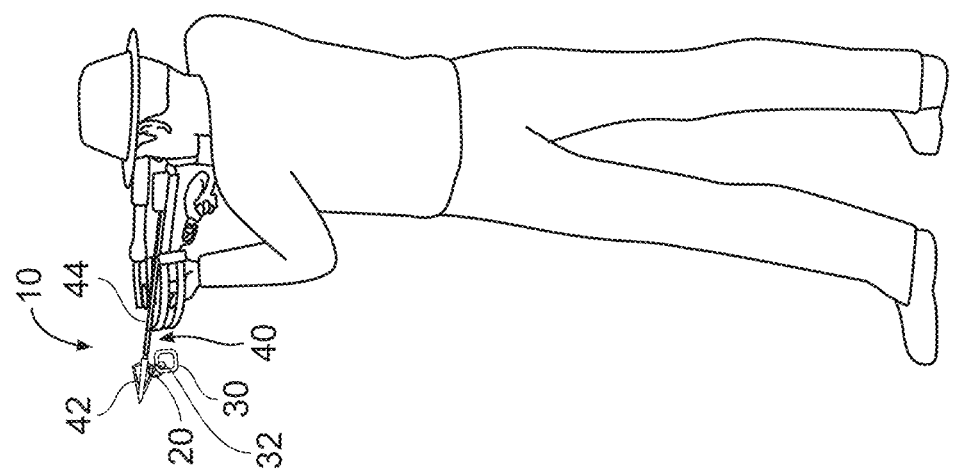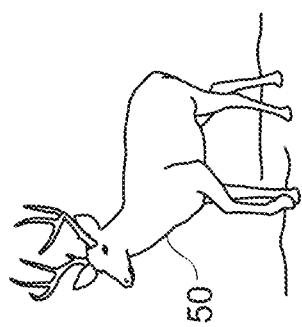
FIG. 2

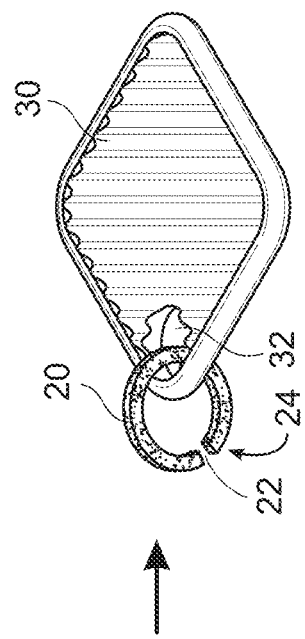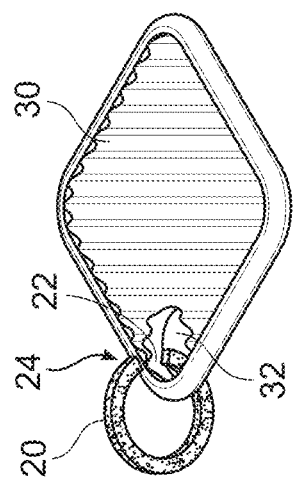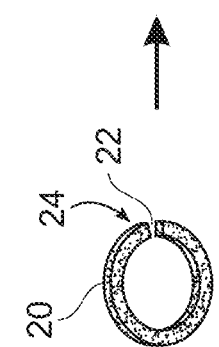
FIG. 8

GPS ARROW SYSTEM TO TRACK A MOVING OBJECT

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a GPS arrow system to track a moving object for tracking and locating an object such as an arrow or an animal that has been struck by an arrow.

Related Art

Any discussion of the related art throughout the specification should in no way be considered as an admission that such related art is widely known or forms part of common general knowledge in the field.

Arrow tracking devices have been in use for a number of years, and encompass a broad range of technologies, from very low-tech to decidedly high-tech, such as electronic receiver/transmitter systems for use with hand-held devices that indicate the direction and range of the object to be located.

Tracking devices themselves, including those capable of use for tracking arrows and animals, are commercially available. However, most specialized arrow-tracking systems do not provide for the use of reusable, readily available tracking devices that are designed to enter and stay inside the animal and allow for tracking even if the arrow falls out of the animal.

SUMMARY

An example embodiment is directed to a GPS arrow system to track a moving object, such as a deer or other animal. The GPS arrow system includes an arrowhead comprising a blade and an opening in the blade, a GPS tracking unit comprising a GPS attachment opening, and an attaching ring for attaching the GPS tracking unit to the arrowhead. The attaching ring comprises a gap that is expandable so that an end of the attaching ring can be passed through the opening in the arrowhead and the GPS attachment opening, for connecting the GPS tracking unit to the arrowhead. The arrowhead may be removably or permanently attachable to the shaft of an arrow, and may be removably attachable to an arrow shaft with a threaded connector.

The GPS tracking unit of the GPS system for tracking an object may comprise a battery in a battery compartment of the GPS tracking unit. Further, the GPS tracking unit may be substantially rectangular. Still further, the arrowhead may comprise a longitudinal axis and a plurality of blades defining a cross-sectional distance normal to the longitudinal axis, and a maximum distance between the sides of the GPS tracking unit may be less than the cross-sectional distance, so that the GPS tracking unit will fit through an entry opening made by the blades.

In the GPS system for tracking an object the attaching ring may be plastic. In addition, the plurality of blades may be plastic, so that the GPS tracking unit will tend to break away from the arrow and remain inside an animal to be tracked when the animal is shot with the arrow.

The GPS tracking unit of the GPS system for tracking an object may comprise a radio transmitter for transmitting a radio signal to a receiver, such as a handheld device with a receiver. The handheld device may be a stand-alone receiver or a smartphone.

There has thus been outlined, rather broadly, some of the embodiments of the GPS arrow system to track a moving object in order that the detailed description thereof may be better understood, and in order that the present contribution to the art may be better appreciated. There are additional embodiments of the GPS arrow system to track a moving object that will be described hereinafter and that will form the subject matter of the claims appended hereto. In this respect, before explaining at least one embodiment of the GPS arrow system to track a moving object in detail, it is to be understood that the GPS arrow system to track a moving object is not limited in its application to the details of construction or to the arrangements of the components set forth in the following description or illustrated in the drawings. The GPS arrow system to track a moving object is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 1 is a perspective view of a GPS arrow system to track a moving object in accordance with an example embodiment.

FIG. 2 is another perspective view of a GPS arrow system to track a moving object in accordance with an example embodiment.

FIG. 8 is a perspective view of an alternative embodiment illustrating the assembly of some components of a GPS arrow system to track a moving object in accordance with an example embodiment.

DETAILED DESCRIPTION

A. Overview

Figure 3:
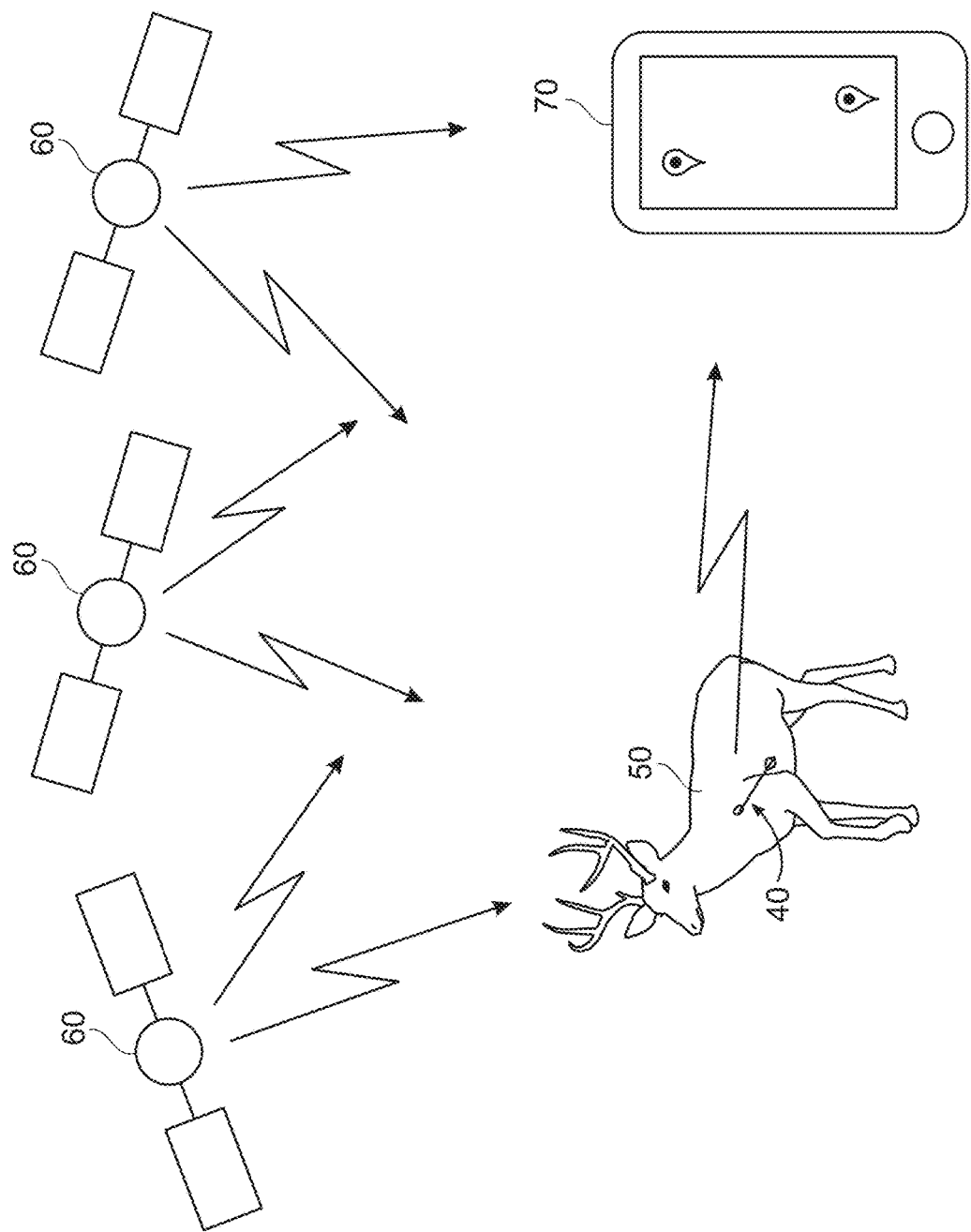
FIG. 3 is a perspective view of a GPS arrow system to track a moving object in accordance with an example embodiment.

An example GPS arrow system 10 to track a moving object generally comprises an arrow 40 with an arrow shaft 44, and an arrowhead 42 comprising a blade 46 and an opening 47 in the blade, a GPS tracking unit 30 comprising a GPS attachment opening 32, and an attaching ring 20 for attaching the GPS tracking unit 30 to the arrowhead 42. The attaching ring 20 comprises a gap 22 that is expandable so that an end 24 of the attaching ring 20 can be passed through the opening 47 in the arrowhead and the GPS attachment opening 32, for connecting the GPS tracking unit 30 to the arrowhead 42.

The use of a GPS tracking unit 30 attached to an arrowhead 42 allows a hunter to track an animal 50 after it has been shot. The GPS system 10 may include a small GPS tracking unit 30 that is capable of receiving position signals from any of a number of GPS satellites 60 that are "visible" to the tracking unit-meaning that the device 30 is capable of receiving the signals from the satellites. The GPS satellite system overall comprises 24 satellites 60 that orbit the earth at an altitude of about 12,000 miles. The existing constellation of GPS satellites is spread out, by design, so that four or more of them have a direct line-of-sight view of any point on the planet. When a GPS receiver, such as GPS tracking unit 30, receives a signal from three or more GPS satellites 60, it will be capable of determining its own position to a reasonable degree of accuracy, a degree that is at least sufficient for a hunter using a handheld device 70 to locate the animal 50, which will have the GPS tracking unit 30 within its flesh after being shot.

The arrowhead 42 of the present system 10 can be removably or permanently attachable to the shaft 44 of the arrow 40, and as an example may be removably attachable to the arrow shaft 44 with a threaded connector 48, which may comprise a male threaded connector 48 which allows the arrowhead 42 to be screwed into the arrow shaft 44. Alternatively, the system may use an arrow that has an arrowhead 42 permanently attached to the shaft 44, such as an adhesive attachment.

The GPS tracking unit 30 of the GPS system 10 for tracking an object may comprise a battery 80 in a battery compartment of the GPS tracking unit 30. The battery may be a 3-volt button cell with a long standby life, as just one possible example. Further, the GPS tracking unit 30 may be substantially rectangular—for example, it may be a mainly rectangular device with rounded corners. In addition, the arrowhead 42 may comprise a longitudinal axis and a plurality of blades 46 defining a cross-sectional distance D normal to the longitudinal axis, and a maximum distance W between the sides of the GPS tracking unit may be less than the cross-sectional distance D, so that the GPS tracking unit 30 will fit through an entry opening made by the blades 46.

In the GPS system 10, the attaching ring 20 may be plastic. In addition, the plurality of blades 46 may be plastic, so that the GPS tracking unit 30 will tend to break away from the arrow and remain inside an animal 50 to be tracked when the animal 50 is shot with the arrow. The device 30 may break away due to the increased tissue resistance upon entering the animal's flesh. The resistance cause by the GPS unit 30 within the tissue may be greater due to the shape of the GPS tracking unit 30. For example, if the unit is square or rectangular as shown generally in the figures, it will encounter greater resistance inside the animal, and thus be more likely to break off from the attaching ring 20, the arrowhead 42, or both.

In addition, either the plastic arrowhead blade 46, or the attaching ring 20, or both of them, may break off upon the arrow's striking or entering the animal 50. This helps ensure that the wounded animal 50 can be found in the event that the arrow 40 passes completely through the animal 50.

The GPS tracking unit 30 may comprise an internal radio transmitter for transmitting a radio signal to a receiver, such as a handheld device 70 with a radio receiver, such as a GPS receiver, a Bluetooth receiver, Wi-Fi, etc. The handheld device 70 may be a stand-alone receiver suitable for receiving GPS signals, or it may be a smartphone.

B. Arrow

Figure 4:
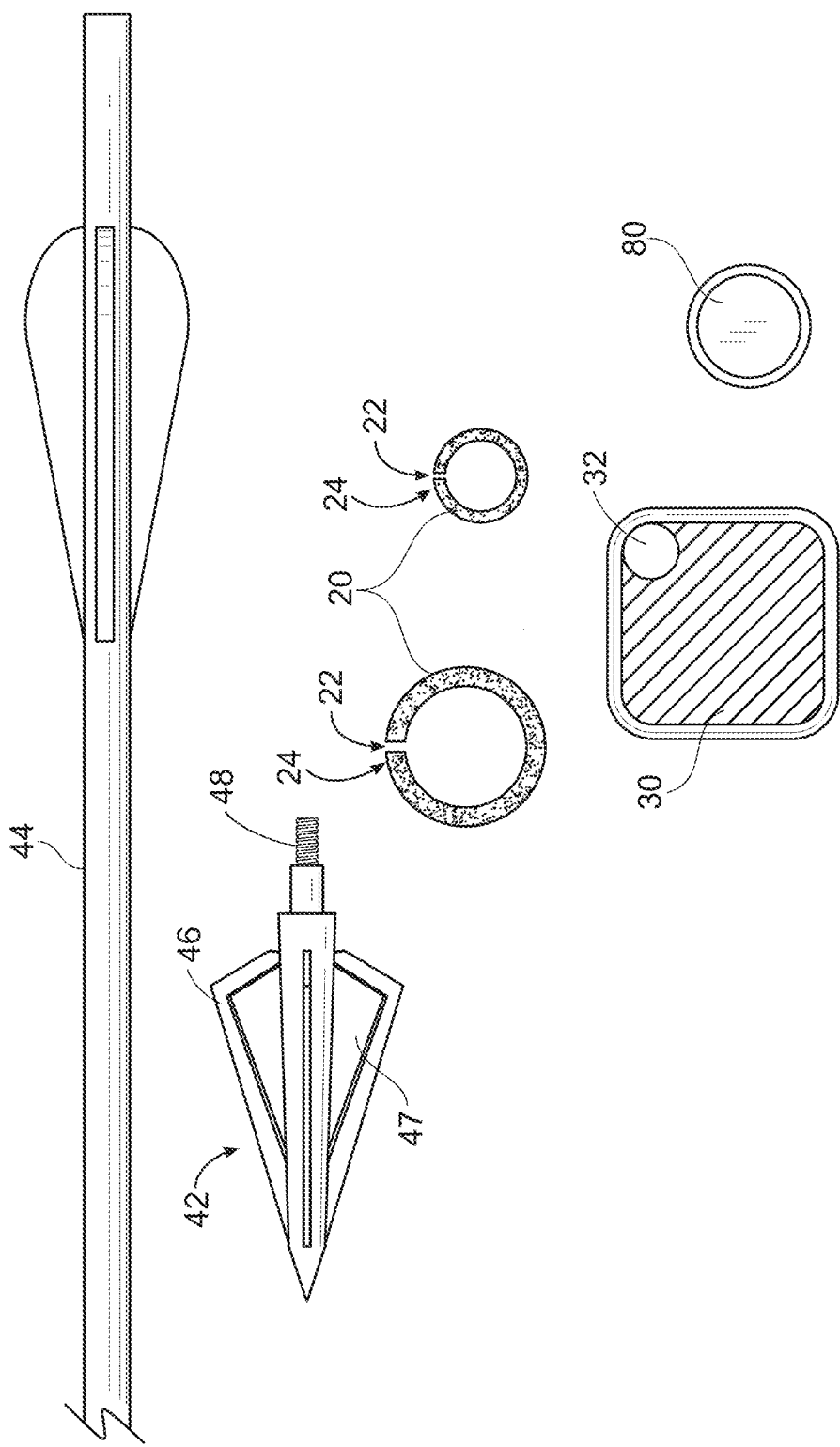
FIG. 4 is a top view showing the components of a GPS arrow system to track a moving object in accordance with an example embodiment.

As noted above, an example GPS system 10 to track a moving object generally comprises an arrow 40 with an arrow shaft 44, and an arrowhead 42 comprising a blade 46 and an opening 47 in the blade, a GPS tracking unit 30 comprising a GPS attachment opening 32, and an attaching ring 20 for attaching the GPS tracking unit 30 to the arrowhead 42. As shown in FIG. 4, the arrowhead 42 may be a broadhead with one or more blades 46, usable for hunting game, of the type that has openings 47 in each blade 46. The openings 47 may be different sizes, and may even be limited to a single blade 46 of the arrowhead if desired. Such an arrangement may be desirable if a plastic arrowhead 42 is used, as a solid blade 46, or one with a smaller hole or opening 47, is used, so that the arrowheads are generally stronger.

As also discussed previously, a plastic arrowhead blade 46 may be designed to break after entering the tissue of the animal 50. This is of course more likely if the arrowhead is made of plastic, even high-strength plastic. Other arrowhead types and materials may also be used with the tracking system 10, such as standard metal broadheads. Such arrowheads 42 will still work with the system because the attaching ring 20 will also break off after the arrowhead has entered the animal 50, thus leaving the GPS tracking unit 30 inside the animal after it has been shot. The system will also work even if the arrowhead 42 or attaching ring 20 does not break oft such as when the arrow does not pass through the animal 50. Different types of arrowheads, such as mechanical arrowheads, can be used with the system as well, and may be designed to reduce the likelihood that an arrow 40 will pass through an animal 50.

The arrowhead 42 of the present system 10 can be removably or permanently attachable to the shaft 44 of the arrow 40, and as an example may be removably attachable to the arrow shaft 44 with a threaded connector 48, which may comprise a male threaded connector 48, which allows the arrowhead 42 to be screwed into the arrow shaft 44. Alternatively, the system may use an arrow that has an arrowhead 42 permanently attached to the shaft 44, such as an adhesive attachment. Arrows 40 usable with the system may be standard arrows, as shown for example in FIG. 1, or they may be crossbow bolts, as shown in FIG. 2. Further, since the GPS tracking unit 30 is attachable to virtually any arrowhead with an opening, the system may be used with pre-assembled arrows 40 that were not specifically designed for use with a tracking system, including with arrows 40 having permanently attached arrowheads. In addition, the system may be used with arrowheads that did not originally have openings in their blades, by simply drilling through the blade 46 to create an opening or openings 47. Drilling would be especially easy if plastic arrowheads 42 are used.

C. GPS Tracking Unit

Figure 5:
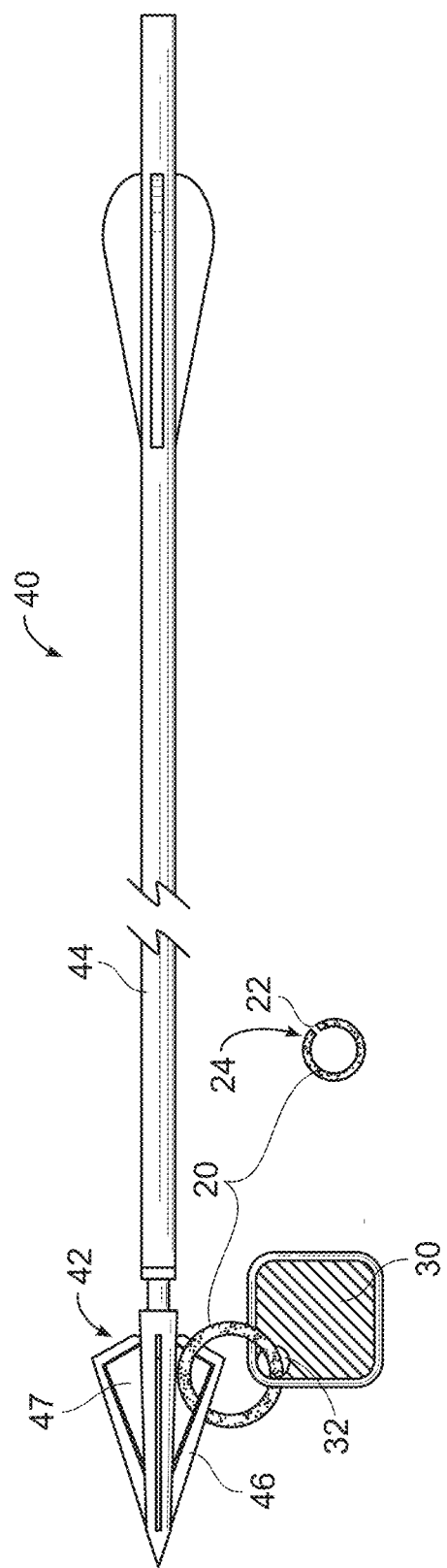
FIG. 5 is a top view showing some assembled components of a GPS arrow system to track a moving object in accordance with an example embodiment.

In some embodiments of the GPS system 10, a GPS tracking unit 30 comprising a GPS attachment opening 32 may be used. The use of a GPS tracking unit 30 attached to an arrowhead 42 allows a hunter to track an animal 50 after it has been shot. The GPS tracking unit 30 is generally small enough to be attached to an arrowhead or other part of an arrow 40, as shown in FIGS. 4 and 5. The GPS tracking unit 30 includes a GPS receiver, to receive position signals from three or more GPS satellites 60 that have line-of-sight visibility (even if through some obstacles) to the tracking unit 30. The overall system is shown in FIG. 3, although in practice it is likely that more satellites 60 would be available than just those shown. When position signals are received from three or more GPS satellites 60, the tracking unit 30 will be capable of determining its own position so that a hunter using a handheld device 70 may locate the animal 50 after it has been shot. This is especially useful in the even that the animal is not killed immediately, and runs some distance before a hunter is able to locate the animal.

Figure 10:
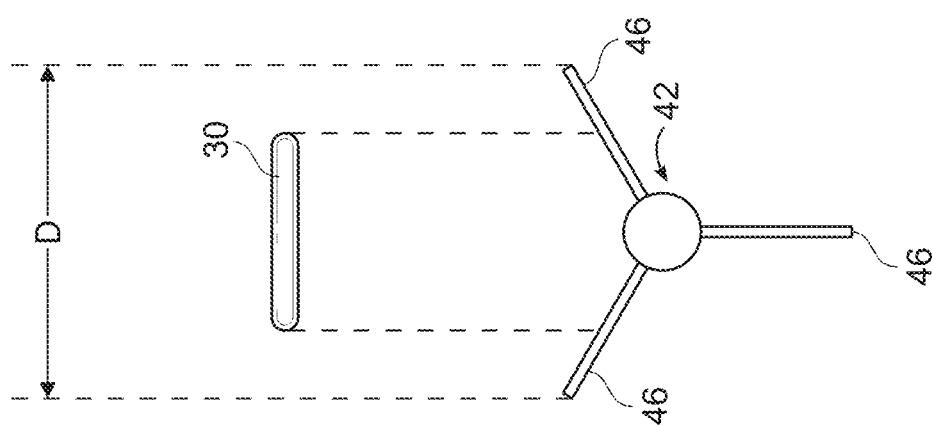
FIG. 10 is an end view illustrating the relative size relationship of some components of a GPS arrow system to track a moving object in accordance with an example embodiment.

The GPS tracking unit 30 of the GPS system 10 for tracking an object may comprise a battery 80 in a battery compartment of the GPS tracking unit 30. Further, the GPS tracking unit 30 may be substantially rectangular—for example, it may be a mainly rectangular device with rounded corners (i.e., wafer shaped). Referring to FIG. 10, the arrowhead 42 may have a longitudinal axis and a plurality of blades 46 (e.g., three blades, as shown) defining a cross-sectional distance D normal to the longitudinal axis, and a maximum distance W between the sides of the GPS tracking unit 30 may be less than the cross-sectional distance D, so that the GPS tracking unit 30 will fit through an entry opening made by the blades 46.

The GPS tracking unit 30 may also include a GPS attachment opening 32, as best shown in FIG. 4. If the GPS unit 30 is substantially rectangular or square (for example, square with rounded corners), the attachment opening 32 may be located in one of the corners. This location of the opening allows the unit 30 to be readily attached to arrowhead 42 with an attaching ring 20, as shown in FIGS. 5-9. The GPS tracking unit 30 can transmit position signals that can be received by handheld unit 70 being carried by a user, such as a hunter. As illustrated in FIG. 3, the handheld unit 70 can display information such as the distance between the user and the GPS tracking unit 30, as well as the direction or heading between the handheld device 70 and the GPS unit 30, which will be where the animal 50 is.

D. GPS Attaching Ring

The GPS tracking unit 30 is generally small enough to be attached to an arrowhead with a GPS attaching ring 20, as shown in FIGS. 4 and 5. The GPS attaching ring 20 may be different sizes, as shown in FIG. 4, as just one possible example. As the name suggests, the attaching ring 20 may be in the form of a ring, and may for example have a square or round profile, although other cross-sectional shapes are possible as well. As shown, however, the rings have proportions similar to common O-rings, and have a cross section such that they will fit into the attachment opening 32 of the GPS tracking unit 30, and also into the generally larger opening 47 in arrowhead 42.

Figure 11:
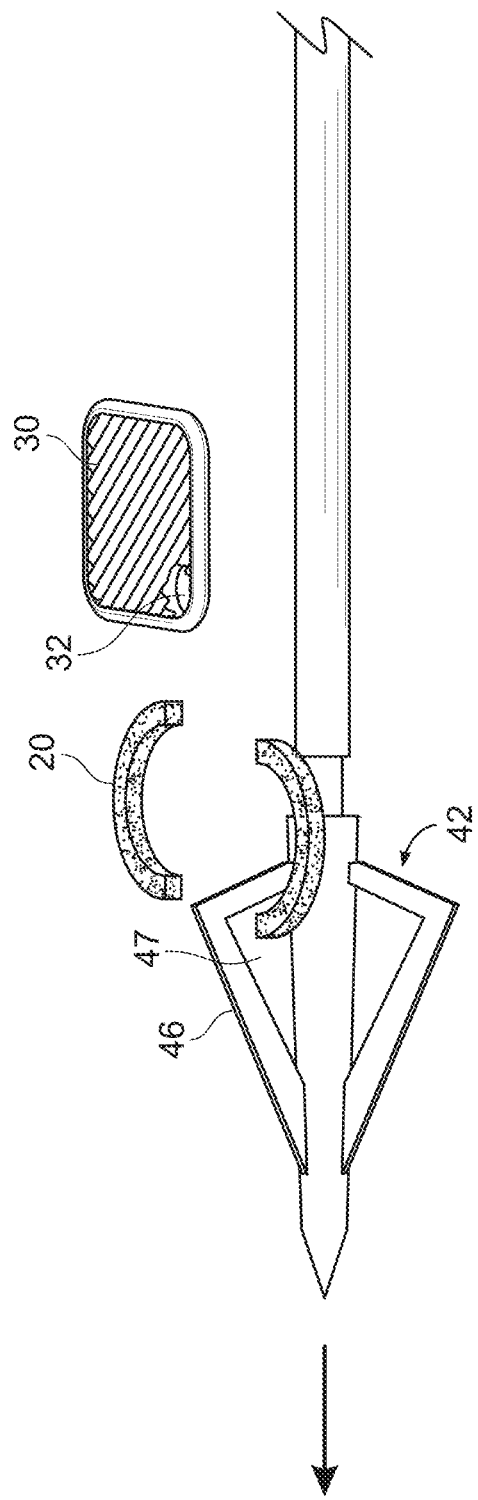
FIG. 11 is a perspective view showing the assembly of some components of a GPS arrow system to track a moving object in accordance with an example embodiment.

The attaching ring 20 may be made of rubber, plastic, steel, or other metals and materials, depending on the strength and other properties that are desired. Specifically, the attaching ring 20 may be designed to break under different amounts of force, which can be dictated by the material used, and also its thickness. The force that will cause attaching ring 20 to break will typically be produced when the arrow enters an animal 50, due to the added resistance of the animal's tissues. When this occurs, the GPS unit 30 will remain in the animal regardless of what happens to the rest of the arrow, as shown in FIG. 11.

The GPS attaching ring 20 will generally include a small gap 22, that is less than the thickness of both the arrowhead's blade 46, and the thickness of the GPS tracking unit 30. For example, the thickness of the arrowhead blade 46 may be about 1/10", so the attaching ring gap 22 may be smaller than that. This helps ensure that the attaching ring 20 will remain attached to both the arrowhead and the GPS tracking unit 30, since the attaching ring is used by spreading the ends 24 apart temporarily to move the ring over the openings in both the arrowhead and the tracking unit. When a user spreads the attaching ring 20 to open the gap 22, an end 24 of the ring 20 can be inserted through the arrowhead opening 47 and the GPS tracking unit's attachment opening 32. This procedure is illustrated in FIGS. 6-9, with two different sized attaching rings 20.

Figure 6:
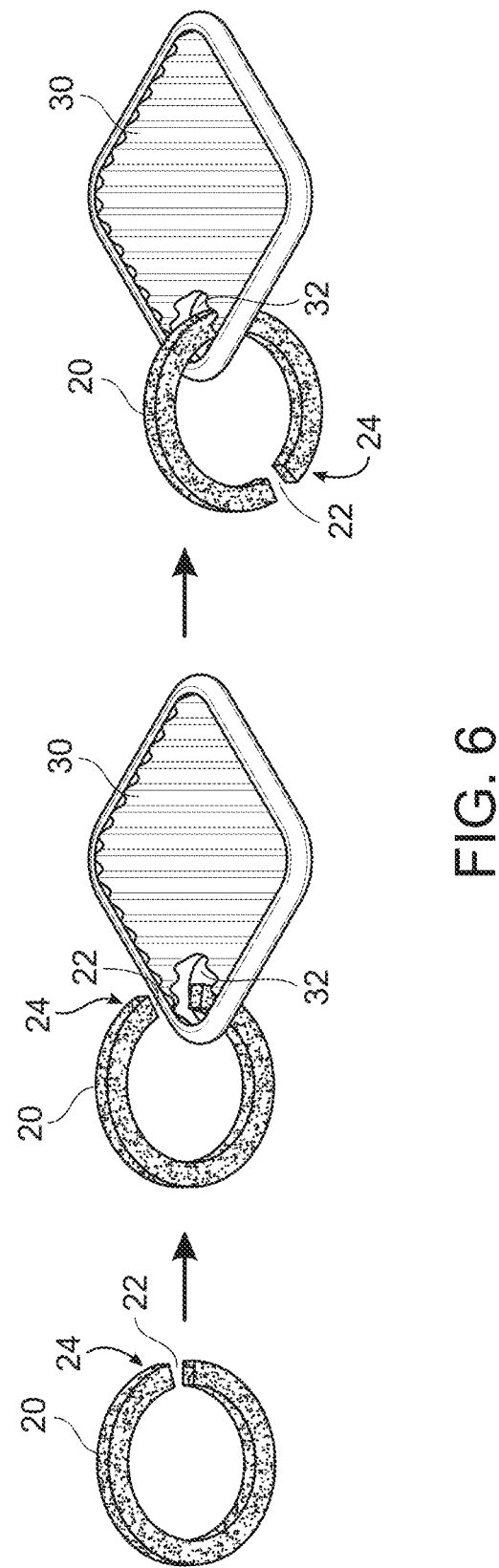
FIG. 6 is a perspective view illustrating the assembly of some components of a GPS arrow system to track a moving object in accordance with an example embodiment.

Specifically, as shown in FIGS. 6 and 8, the ring 20 is first spread by a user to open the gap 22, so that an end 24 of the ring 20 can be inserted into the GPS attachment opening 32. Then, when the ring 20 is released, it will close to its nominal gap size, capturing the GPS tracking unit 30, as shown in the right-most figure. As mentioned previously, the ring 20 may vary in size, and FIGS. 6 and 7 illustrate a somewhat larger ring, while FIGS. 8 and 9 illustrate a smaller ring, which will generally function the same as the larger one, although the smaller ring will hold the GPS tracking unit 30 closer to the arrowhead 42.

Figure 7:
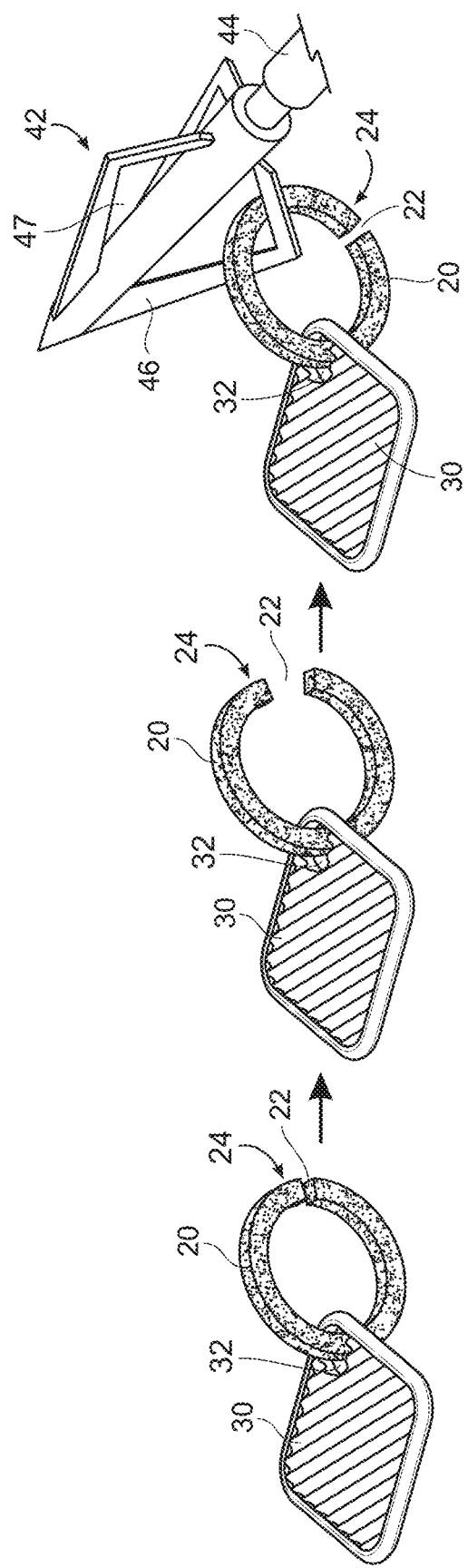
FIG. 7 is a perspective view illustrating the further assembly of some components of a GPS arrow system to track a moving object in accordance with an example embodiment.
Figure 9:
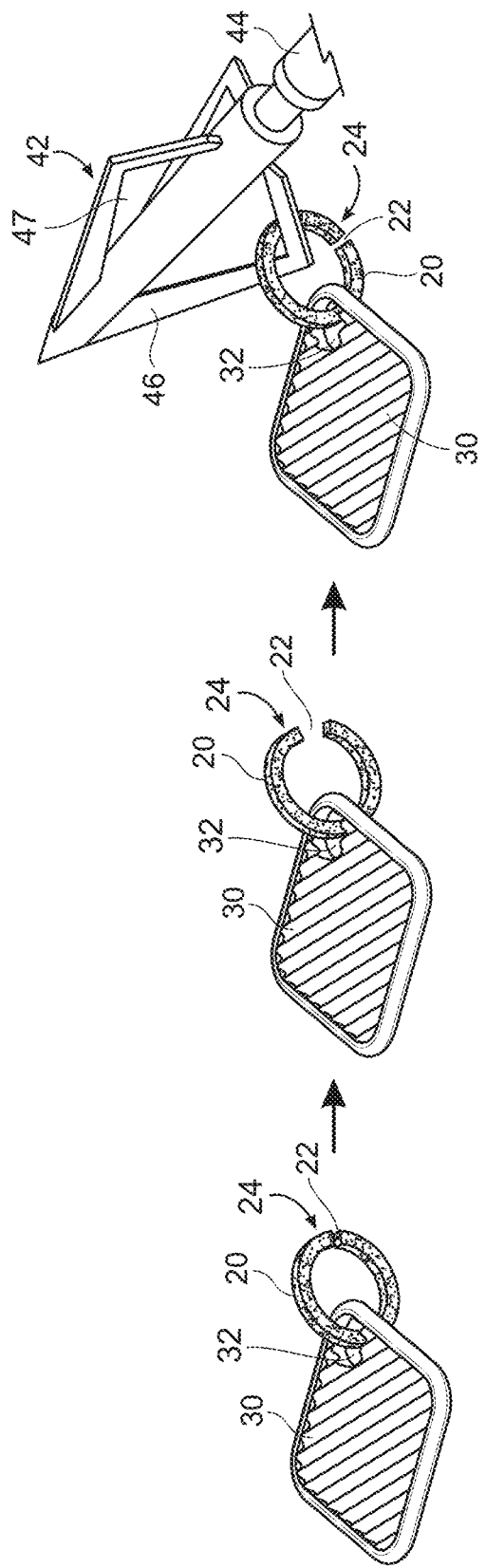
FIG. 9 is a perspective view of an alternative embodiment illustrating the further assembly of some components of a GPS arrow system to track a moving object in accordance with an example embodiment.

As shown in FIGS. 7 and 9, once the attaching ring 20 has been hooked to the GPS tracking unit 30, the procedure of opening the gap 22 and inserting the end 24 through the opening 47 in the arrowhead is repeated, and when completed, the GPS tracking unit 30 is attached to the arrowhead 42 by the ring 20.

E. Operation of Preferred Embodiment

In use, the tracking system 10 is assembled by a user as shown in FIGS. 6 and 8, with the gap 22 in ring 20 being opened so that an end 24 of the ring 20 can be inserted into the GPS attachment opening 32. The ring 20 will thus be attached to the GPS tracking unit 30, as shown in the right-most figures. As shown in FIGS. 7 and 9, once the attaching ring 20 has been hooked to the GPS tracking unit 30, the procedure of opening the gap 22 and inserting the end 24 through the opening 47 in the arrowhead is repeated, and when completed, the GPS tracking unit 30 is attached to the arrowhead 42 by the ring 20.

The attaching ring 20 may be rubber, plastic, steel, or other metals and materials, and it may be designed intentionally so that it will break when the GPS tracking unit 30 enters an animal, to help ensure that the tracking unit stays with the animal 50 even if that arrow passes through the animal. For example, the attaching ring 20 may be designed to break under different amounts of force, which can be dictated by the material used, and also its thickness. When the arrow enters an animal 50, due to the added resistance of the animal's tissues, the attaching ring 20 may break away. When this occurs, the GPS unit 30 will remain in the animal regardless of what happens to the rest of the arrow, as shown in FIG. 11.

The system may be used with an arrow 40 having an arrow shaft 44, and an arrowhead 42 comprising a blade 46 and an opening 47 in the blade. The GPS tracking unit 30 comprises a GPS attachment opening 32, and an attaching ring 20 for attaching the GPS tracking unit 30 to the arrowhead 42. As shown in FIG. 4, the arrowhead 42 may be a broadhead usable for hunting game. The broadhead may have openings 47 in each blade 46, any one of which may be used for holding the attaching ring 20 and the GPS unit 30 to the arrowhead. The openings 47 may be of different sizes, and may further be limited to a single blade 46 of the arrowhead if desired.

Such an arrangement may be desirable if a plastic arrowhead 42 is used, such as one with a solid blade 46, or one with a smaller hole or opening 47, is used. In some instances, solid blade arrowheads 42 may be desirable, as they may be arrowheads are generally stronger. However, solid blade arrowheads may not always be desired, for example, in windy conditions, or when a greater likelihood of the GPS tracking unit 30 breaking away from the arrow 40 is desired. In addition, the system may be used on an existing arrow that may not have been specially made for it. For example, a user may drill a hole in an arrowhead 42 that has solid blades, for attaching the ring 20.

The arrowhead 42 of the system 10 can be attached to the shaft 44 of the arrow 40. It may either be permanently attached, or it may be removable. For example, the arrowhead may be attached to the arrow shaft 44 with a threaded connector 48, which may comprise a male threaded connector 48 that allows the arrowhead 42 to be screwed into the arrow shaft 44. Alternatively, the system may use an arrow that has an arrowhead 42 permanently attached to the shaft 44, such as with an adhesive attachment.

The system may be conveniently made available in kit form, the main components of which are shown in FIG. 4. For example, the kit may include arrowhead 42, GPS tracking unit 30, and multiple GPS attaching rings 20, of which different sizes may be included. The kit may also include a 3-volt button type battery 80, which may be supplied uninstalled so that the battery life is not degraded before the kit is purchased. The kit may also include instructions for downloading and installing an app if the system is to be used with a smartphone as handheld device 70, although, as mentioned above, a dedicated handheld device other than a smartphone, may be employed as handheld device 70. Such a device may be sold or purchased separately, or may be included in the kit. The arrow or crossbow bolt 40 may also be included in the kit. The kit and system may be either single-use, especially if a plastic arrowhead 42 is used, but the GPS unit may be reused, as it is attachable to different arrowhead by any of the attaching rings 20 in the kit.

With the system being assembled, a user, such as a hunter, proceeds with his hunt normally, as shown in FIGS. 1 and 2. As shown, the system may be used with any type of bow, such as a long bow, a recurve, compound bow, or a crossbow. The system may also be used to track virtually anything that the GPS tracking unit 30 can be attached to, not just arrows and arrowheads. The GPS tracking unit 30 attached to the arrowhead 42 allows the hunter to track the animal 50 after it has been shot. Tracking is especially useful in cases where an animal 50 moves some distance after it has been shot. In low-visibility environments, for example, it is not uncommon for a hunter to be unable to locate an animal that has run after being shot. This results in waste, as the animal 50 cannot be harvested.

The GPS system 10, and specifically, the small GPS tracking unit 30, is capable of receiving position signals from any of a number of GPS satellites 60 that are "visible" to the tracking unit—meaning that the device 30 is capable of receiving the signals from the satellites. The existing constellation of GPS satellites is spread out, so that it is likely that usable GPS positioning signals are available in most places on earth. When a GPS receiver, for example GPS tracking unit 30, receives a signal from three or more GPS satellites 60, the position data that is usable will generally be sufficient for a hunter using a handheld device 70 to locate the animal 50, which will have the GPS tracking unit 30 within its flesh after being shot. In addition, if the hunter misses his target, the GPS tracking system 10 may also be used to locate the arrow 40, so that it can be reused.

As shown in FIG. 3, the GPS tracking unit 30 is not only capable of receiving GPS signals, but may also have an internal radio transmitter for transmitting a radio signal to a receiver, such as a handheld device 70 with a radio receiver, such as a GPS receiver, a Bluetooth receiver, Wi-Fi, etc. The handheld device 70 may be a stand-alone receiver suitable for receiving GPS signals as well as other types of radio signals, or it may be a smartphone, which is also capable of receiving not only GPS signals, but other types and formats of radio signals as well. The handheld unit 70 can display information such as the distance between the user and the GPS tracking unit 30, as well as the direction or heading between the handheld device 70 and the GPS unit 30, which will be where the animal 50 is. Thus, by viewing the display on device 70, a hunter will be able to track the animal 50 much more easily than by visual means alone, which may be ineffective in heavy brush, forest, or when visibility is otherwise low.

The user may track the animal 50 on foot, or by vehicle, such as an all-terrain vehicle. Once the animal has been located, any usable components of the GPS system 10 may be recovered and, if their condition allows, reused. This may be especially useful for the GPS tracking unit 30, which may readily be reused and may be the most expensive, or one of the most expensive, components of the system 10. To facilitate its continued use, the GPS tracking unit's battery 80 may be replaceable.

Unless otherwise defined, all technical and scientific terms used herein have the same meaning as commonly understood by one of ordinary skill in the art to which this invention belongs. Although methods and materials similar to or equivalent to those described herein can be used in the practice or testing of the GPS arrow tracking system 10, suitable methods and materials are described above. All publications, patent applications, patents, and other references mentioned herein are incorporated by reference in their entirety to the extent allowed by applicable law and regulations. The GPS arrow tracking system 10 may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A GPS system for tracking an object, comprising:
   an arrowhead comprising a blade and an opening in the blade, wherein the blade includes an exterior portion;
   a GPS tracking unit comprising a GPS attachment opening;
   an attaching ring for attaching the GPS tracking unit to the arrowhead, the attaching ring comprising a gap that is expandable so that an end of the attaching ring is adapted to pass through the opening in the arrowhead and the GPS attachment opening;
   wherein the attaching ring passes through the opening in the arrowhead and the GPS attachment opening to connect the GPS tracking unit to the arrowhead, wherein the attaching ring encircles and hangs from the exterior portion of the blade.

2. The GPS system for tracking an object of claim 1, wherein the arrowhead is attachable to the shaft of an arrow.

3. The GPS system for tracking an object of claim 2, wherein the arrowhead is removably attachable to the shaft of an arrow.

4. The GPS system for tracking an object of claim 3, wherein the GPS tracking unit comprises a battery.

5. The GPS system for tracking an object of claim 3, wherein the arrowhead comprises a threaded connector for attaching the arrowhead to the shaft.

6. The GPS system for tracking an object of claim 1, wherein the GPS tracking unit is substantially rectangular.

7. The GPS system for tracking an object of claim 6, wherein the GPS tracking unit comprises a plurality of sides and the arrowhead comprises a longitudinal axis and a plurality of blades defining a cross-sectional distance normal to the longitudinal axis, and wherein a maximum distance between the sides of the GPS tracking unit is less than the cross-sectional distance.

8. The GPS system for tracking an object of claim 7, wherein the attaching ring is plastic.

9. The GPS system for tracking an object of claim 8, wherein the plurality of blades are plastic.

10. The GPS system for tracking an object of claim 1, wherein the blade is plastic.

11. The GPS system for tracking an object of claim 1, wherein the GPS tracking unit comprises a radio transmitter for transmitting a radio signal to a receiver.

12. The GPS system for tracking an object of claim 1, wherein the attaching ring is plastic.

13. The GPS system for tracking an object of claim 12, wherein the blade is plastic.

* * * * *